(12) United States Patent
Aizawa et al.

(10) Patent No.: US 10,331,953 B2
(45) Date of Patent: Jun. 25, 2019

(54) IMAGE PROCESSING APPARATUS

(71) Applicants: THE UNIVERSITY OF TOKYO, Tokyo (JP); foo.log Inc., Tokyo (JP)

(72) Inventors: Kiyoharu Aizawa, Tokyo (JP); Makoto Ogawa, Tokyo (JP)

(73) Assignees: THE UNIVERSITY OF TOKYO, Tokyo; foo.log Inc., Tokyo ( * ) Notice: Subject to any disclaimer, the term of this patent is extended or adjusted under 35 U.S.C. 154(b) by 47 days.

(21) Appl. No.: 14/783,413

(22) PCT Filed: Apr. 9, 2014

(86) PCT No.: PCT/JP2014/060286
§ 371 (c)(1),
(2) Date: Oct. 8, 2015

(87) PCT Pub. No.: WO2014/168177
PCT Pub. Date: Oct. 16, 2014

(65) Prior Publication Data
US 2016/0070960 A1    Mar. 10, 2016

(30) Foreign Application Priority Data
Apr. 9, 2013 (JP) ................ 2013-081285

(51) Int. Cl.
*G06K 9/00* (2006.01)
*G06T 7/00* (2017.01)
*G06K 9/62* (2006.01)

(52) U.S. Cl.
CPC ....... *G06K 9/00671* (2013.01); *G06K 9/6215* (2013.01); *G06T 7/001* (2013.01); *G06K 2209/17* (2013.01); *G06T 2207/30128* (2013.01)

(58) Field of Classification Search
CPC .......... G06K 2209/17; G06K 9/00671; G06K 9/6215; G06T 2207/30128; G06T 7/001
See application file for complete search history.

(56) References Cited

U.S. PATENT DOCUMENTS

2005/0076004 A1   4/2005  Yanagisawa et al.
2010/0111383 A1*  5/2010  Boushey .................. G06K 9/00
                                                      382/128

(Continued)

FOREIGN PATENT DOCUMENTS

JP    2003-030335 A    1/2003
JP    2004-164038 A    6/2004

(Continued)

OTHER PUBLICATIONS

International Search Report for PCT/JP2014/060286, dated May 13, 2014.

(Continued)

*Primary Examiner* — Peter D Le

(57) ABSTRACT

Provided is an image processing apparatus which is connected to and accessible to a database storing a plurality of pieces of previously prepared reference data, and which stores at least one piece of individual data having an image captured by the user in association with the information regarding the food/beverage contained in the captured image. The image processing apparatus compares information of the food/beverage in the captured image with the reference data stored in the database and the individual data, and acquires the food/beverage information included in the reference data together with the reference image similar to the captured image, the food/beverage information associated with the captured image in the individual data, or the food/beverage information in the reference data or the (Continued)

individual data including the food/beverage information relating to the captured image.

3 Claims, 7 Drawing Sheets

(56) References Cited

U.S. PATENT DOCUMENTS

| | | | |
|---|---|---|---|
| 2010/0249530 A1* | 9/2010 | Rankers | 600/300 |
| 2012/0005222 A1* | 1/2012 | Bhagwan | G06F 17/30389 707/769 |
| 2012/0135384 A1 | 5/2012 | Nakao | |
| 2012/0143856 A1* | 6/2012 | Klinkigt | G06K 9/4671 707/723 |
| 2012/0170801 A1* | 7/2012 | De Oliveira | G06K 9/6256 382/103 |
| 2013/0058566 A1* | 3/2013 | Sato | G06K 9/4642 382/159 |
| 2013/0170714 A1 | 7/2013 | Aizawa et al. | |

FOREIGN PATENT DOCUMENTS

| | | |
|---|---|---|
| JP | 2005-107990 A | 4/2005 |
| JP | 2006-171984 A | 6/2006 |
| JP | 2007-122311 A | 5/2007 |
| JP | 2008-193570 A | 8/2008 |
| JP | 2010-061383 A | 3/2010 |
| JP | 2012-014678 A | 1/2012 |
| JP | 2012-113627 A | 6/2012 |

OTHER PUBLICATIONS

Written Opinion of the International Searching Authority for PCT/JP2014/060286, dated May 13, 2014.
Japan Patent Office, Office Action for Japanese patent application No. 2013-081285, dated Sep. 13, 2016.
Japan Patent Office, Office Action for Japanese patent application No. 2013-081285, dated May 16, 2017.

* cited by examiner

[FIG. 1]
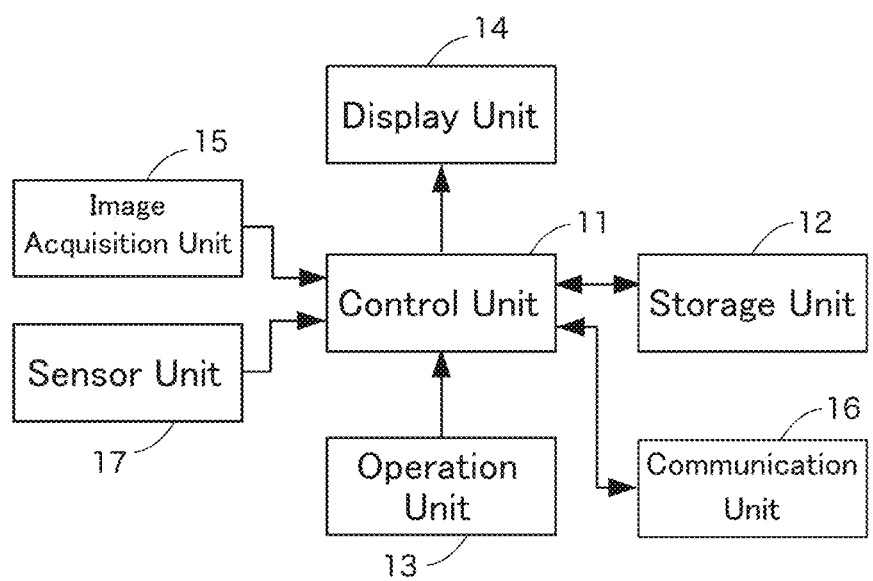

[FIG. 2]
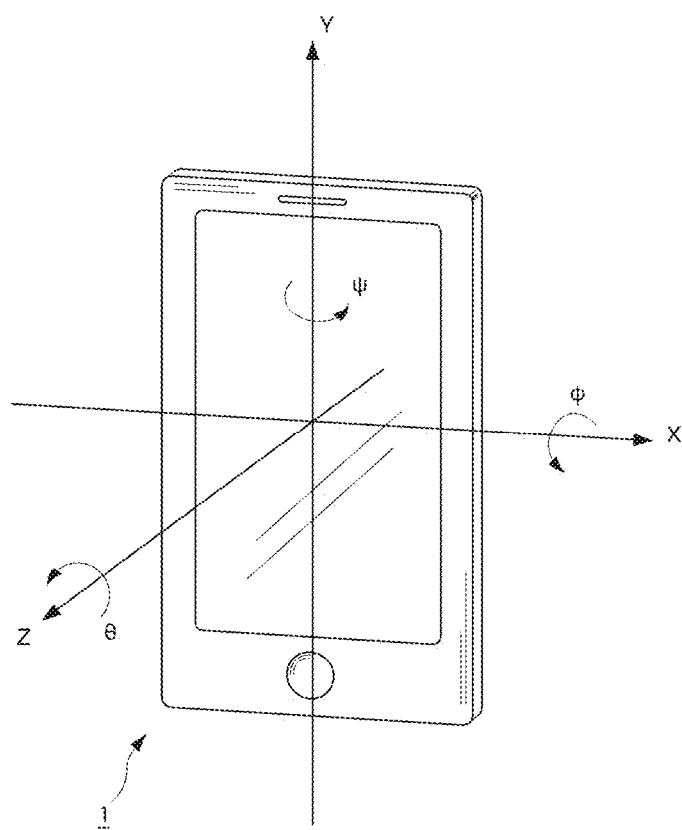

[FIG. 3]
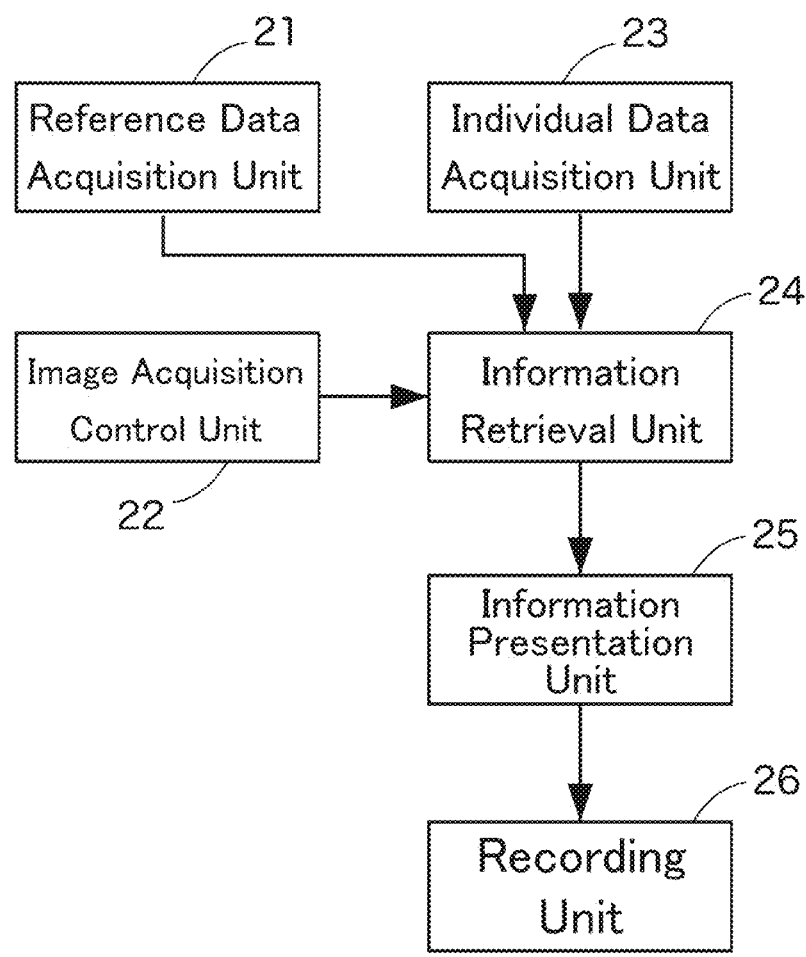

FIG4.A 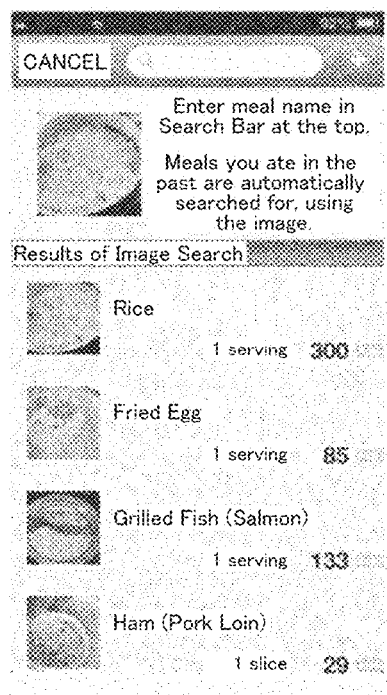
FIG4.B 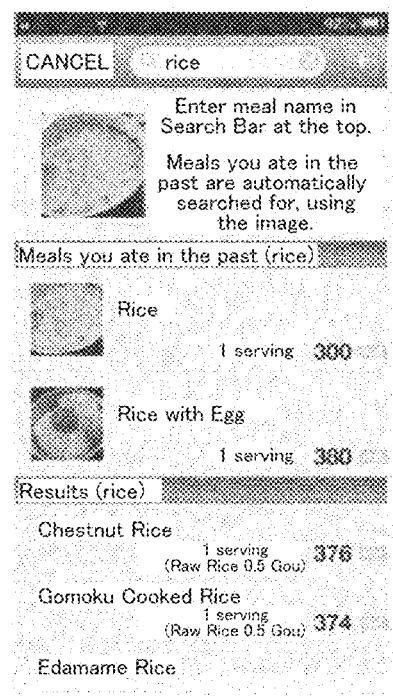

[FIG. 5]

[FIG. 6]
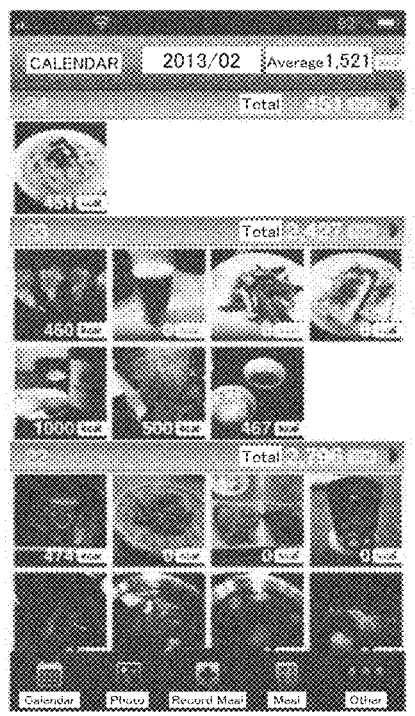

[FIG. 7]
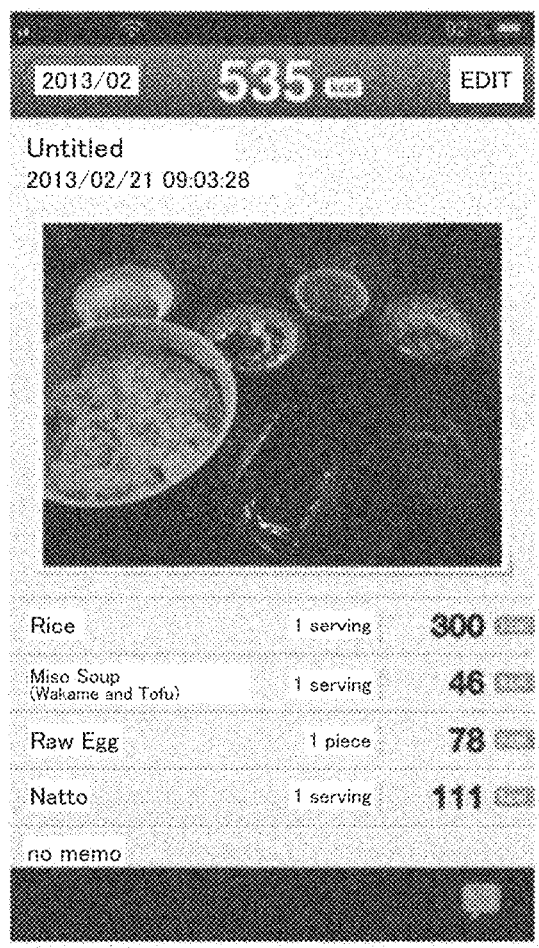

IMAGE PROCESSING APPARATUS

TECHNICAL FIELD

The present disclosure relates to an image processing apparatus which processes food/beverage images.

BACKGROUND ART

Patent Document 1 discloses an idea of identifying the kind of the food (such that the food is croquette) and the quantity of the food from an image, without any communication through a network, and calculating the caloric value of the relevant kind of food having the identified quantity.

PRIOR ART

Patent Document

Patent Document 1: Japanese Unexamined Patent Publication (Kokai) No. 2007-122311

SUMMARY

In the prior arts as mentioned above, for example, in order to determine the kind of a food by comparing images, comparison with previously prepared food images is necessary so that the determination can be performed regarding a kind of food the image of which is taken for the first time. However, depending on the image capturing device provided in an image processing apparatus, the circumstances when a user takes a picture, a user's habit when taking a picture, etc., even if the kind of the food is the same, the captured image may be recognized as totally different from the previously prepared image. Further, even if the kind of the food is the same, the shape of the food may be different. Therefore, identifying a food/beverage by comparing images is difficult, unlike the identification of normal image information.

The present disclosure has been thought of, in view of the above drawbacks. One of the objectives of the present disclosure is to provide an image processing apparatus capable of more effectively performing identification by food/beverage images.

In order solve the above drawbacks, the present disclosure provides an image processing apparatus connected to a database which holds a plurality of pieces of reference data including previously prepared food/beverage information so as to be able to access the same, the image processing apparatus comprising: an holding device which holds at least one piece of individual data including an image captured by a user in association with information of a food/beverage contained in the captured image, an image capturing device which captures an image of a food/beverage, an acquisition device which compares the food/beverage information regarding the captured image, with the reference data held in the database and with the individual data held in the holding device, and acquires food/beverage information included in the reference data together with a reference image similar to the captured image, food/beverage information associated with the captured image in the individual data, or food/beverage information in the reference data or the individual data including the food/beverage information regarding the captured image, and a holding control device which controls the holding device to hold the acquired food/beverage information in association with the captured image, as the individual data.

According to the present disclosure, identification by food/beverage images can be performed more effectively.

BRIEF DESCRIPTION OF DRAWINGS

FIG. 1 is a block diagram showing a structural example of an image processing apparatus according to an aspect of the present disclosure.

FIG. 2 is an explanatory view showing an example of information expressing the position of an image processing apparatus according to an aspect of the present disclosure.

FIG. 3 is a functional block diagram showing an example of an image processing apparatus according to an aspect of the present disclosure.

FIG. 4 is an explanatory view showing an example of a screen of an image processing apparatus according to an aspect of the present disclosure.

FIG. 5 is an explanatory view showing another example of a screen of an image processing apparatus according to an aspect of the present disclosure.

FIG. 6 is an explanatory view showing still another example of a screen of an image processing apparatus according to an aspect of the present disclosure.

FIG. 7 is an explanatory view showing still another example of a screen of an image processing apparatus according to an aspect of the present disclosure.

ASPECT OF DISCLOSURE

An aspect of the present disclosure will be explained with reference to the drawings. As exemplified in FIG. 1, an image processing apparatus 1 according to an aspect of the present disclosure comprises a control unit 11, a storage unit 12, an operation unit 13, a display unit 14, an image acquisition unit 15, a communication unit 16, and a sensor unit 17.

Here, the control unit 11 is a program-controlled device, such as a CPU (Central Processing Unit), and operates in accordance with a program stored in the storage unit 12. Detailed operation of the control unit 11 will be described later below.

According to an example of the present aspect, the storage unit 12 is a memory device, etc., which holds a program to be executed by the control unit 11. The program may be provided by being stored in a computer-readable non-transitory medium, such as a DVD-ROM (Digital Versatile Disc Read Only Memory), and copied to the storage unit 12. The storage unit 12 also functions as a work memory for the control unit 11. The storage unit 12 also functions as a holding device which holds at least one piece of individual data in which an image captured by a user is associated with information regarding a food/beverage contained in the captured image. Here, the information regarding the food/beverage includes, for example, the name of the food/beverage ("rice", "croquette", etc.), and nutritional value information (a caloric value, etc.) for a unit quantity (per serving, per gram, per cup, etc.) designated by a user and respectively determined by a predetermined method (for example, on the basis of a previously designated table of calories).

The operation unit 13 is, for example, a transparent touch panel laminated on the display unit 14. The operation unit 13 generates information expressing the position designated by a user through touching, etc., and outputs the generated information to the control unit 11. The display unit 14 is a liquid crystal display panel, etc., which displays and outputs image information in accordance with the instruction input from the control unit 11.

The image acquisition unit 15 is an image capturing device, such as, for example, a camera secured to a housing, which acquires image information by capturing an image. The image acquisition unit 15 outputs the image information acquired by capturing an image, to the control unit 11. The communication unit 16 is a network interface, etc., which, in accordance with instructions input from the control unit 11, transmits/receives information to/from an external computer through a wireless LAN such as Wi-Fi or a mobile phone network. Further, the communication unit 16 outputs the information received from the external computer to the control unit 11.

The sensor unit 17 measures and outputs circumstance information relating to the circumstances around the image processing apparatus 1. For example, the sensor unit 17 includes a tilt sensor which measures the sizes of the angle $\varphi$ around the X-axis (for example, the lateral direction of the housing plane), the angle $\psi$ around the Y-axis (the longitudinal direction of the housing plane), and the angle $\theta$ around the Z-axis (the thickness direction of the housing), between the position where the housing is arranged and the predetermined normal position, and an orientation sensor which measures whether the gravity direction is closer to the X-axis direction or the Y-axis direction (namely, whether the housing is arranged in portrait or landscape) (FIG. 2). Further, the sensor unit 17 may also include a GPS (Global Positioning System) sensor which measures the current location.

According to the present aspect, the control unit 11 functions to acquire image information to be processed, and to output the acquired image information to the display unit 14 to display the same thereon. The control unit 11 executes the program stored in the storage unit 12, and thereby, operates as functionally having a structure exemplified in FIG. 3. Namely, as exemplified in FIG. 3, the control unit 11 functionally comprises a reference data acquisition unit 21, an image acquisition control unit 22, an individual data acquisition unit 23, an information retrieval unit 24, an information presentation unit 25, and a recording unit 26.

The reference data acquisition unit 21 accesses a database which holds a plurality of pieces of previously prepared reference data, and acquires the reference data. According to an example of the present aspect, the database holding the reference data may be stored in the storage unit 12. Here, the reference data includes food/beverage information in which the name of a food/beverage is held in association with the nutritional value information (in the following explanation, the nutritional value information being a caloric value, byway of example) per predetermined quantity of the food/beverage. The reference data may further include a food/beverage image as a reference image.

The image acquisition control unit 22 receives instructions from a user, and controls the image acquisition unit 15 to acquire an image. The image acquisition control unit 22 converts the acquired image to a predetermined format, for example, Exif (Exchangeable image file format), etc., capable of including various types of metadata. Further, according to an example of the present aspect, the image acquisition control unit 22 executes a segmentation process regarding the acquired image P, by a predetermined method. The segmentation process may include, for example, extracting the outer shape of a food/beverage (or a plate on which the food/beverage is placed) included in the image P by outline extraction, selecting one point located at the inside of the extracted outer shape, and recursively retrieving adjacent pixels having a color similar to the color of the selected point (using conditions such as within a predetermined distance on a predetermined color space), and the like.

The segmentation process may be performed by allowing a user to select a food/beverage portion included in the image P. Namely, the image acquisition control unit 22 displays the image P, prompts the user to sequentially select each food/beverage included in the image P, executes Automatic segmentation according to GrabCut (GrabCut: C. Rother, V. Kolmogorov, and A. Blake, GrabCut: Interactive foreground extraction using iterated graph cuts, ACM Trans. Graph., vol. 23, pp. 309-314, 2004), each time when the user designates the food/beverage image portion, and separates the captured image into the foreground (an image portion including the portion designated by a user) and the background (other image portion).

Thereby, the image acquisition control unit 22 extracts image portions each including each food/beverage (foreground regarding each food/beverage) p1, p2, . . . , with respect to each food/beverage. Then, every time that the image acquisition control unit 22 extracts the relevant image portion, the image acquisition control unit 22 obtains information specifying the extracted image portion pj (j=1, 2, . . . ) (upper-left corner coordinates and lower-right coordinates, etc., of a rectangle circumscribing each image portion), and stores the obtained information in association with the image P. Further, the image acquisition control unit 22 outputs the image P to the information retrieval unit 24 as an image to be used as a search key.

Instead of performing the automatic segmentation such as GrabCut, the image acquisition control unit 22 may allow the user to designate a portion to be extracted. Specifically, the image acquisition control unit 22 displays the image P, prompts the user to sequentially select each food/beverage included in the image P, and when the user designates a food/beverage image by touching a position corresponding to a part of the food/beverage image (in case of a touch panel) or by placing a mouse cursor at the position and pressing a button of the mouse, displays a selectable range and having a predetermined shape such as a rectangle, circle, etc., with its center at the designated position, and having a size which increases (or decreases) corresponding to the time period during which the position has been touched or the mouse button has been pressed, and extracts the selected image portion indicated by the selected range when the user takes his/her finger off the panel or stops pressing the mouse button. The image acquisition control unit 22 may allow the user to perform the above process with respect to each food/beverage to thereby extract image portions p1, p2, . . . , respectively containing foods/beverages.

The individual data acquisition unit 23 reads out the individual data stored in the storage unit 12, and outputs the individual data to the information retrieval unit 24. The information retrieval unit 24 compares the image P output from the image acquisition control unit 22 and used as a search key, with the reference data acquired by the reference data acquisition unit 21 and with the image included in the individual data read-out by the individual data acquisition unit 23, and acquires food/beverage information (the food/beverage information does not have to be one piece) associated with the reference image or a captured image similar to the image P used as the search key.

Further, when information which specifies image portions pj (j=1, 2, . . . ) each expressing a food/beverage is included in association with the image P used as the search key, the information retrieval unit 24 compares each of the image portions pj specified by the information with the images included in the reference data acquired by the reference data acquisition unit 21 and with the images included in the individual data read-out by the individual data acquisition unit 23, and acquires the food/beverage information associated with the reference image or the captured image similar to the image portion pj (a plurality of pieces of food/beverage information may be acquired for each image portion).

Here, the similarity of the images may be determined by using, for example, ORB (E. Rublee, et al., "ORB: An Efficient Alternative to SIFT or SURF," ICCV, 2011), or SIFT (Scale-Invariant Feature Transform), as a feature value of each image to be compared. Further, in case of foods/beverages, importance of color is relatively high, and thus, a feature value of each image to be compared may be calculated and used, regarding a color channel of each image to be compared (R (Red) channel image, B (Blue) channel image, Y (Yellow) channel image), or difference in color channel of each image (R-Y image, B-Y image, etc.). Namely, the information retrieval unit 24 may determine the similarity on the basis of whether the feature values calculated for images to be compared are identical or not.

The information retrieval unit 24 according to the present aspect may not use an image as a search key, and instead, may receive an input of a name (or a part of a name) or a caloric value as an example of nutritional value information, of a food/beverage, from a user, regarding an image of the food/beverage taken by the user. In this case, reference information or individual data which includes the input food/beverage name (or a part of the name) is to be retrieved. Then, the food/beverage information included in the retrieved reference information or individual data is obtained.

The information presentation unit 25 presents the food/beverage information obtained by the information retrieval unit 24, to the user. Specifically, as exemplified in FIG. 4(a), the information presentation unit 25 displays the image P used as a search key (when the search is performed on the basis of a part of an image, the image portion pj used as a part to be compared), and a list (L) of the food/beverage information obtained by the information retrieval unit 24. The food/beverage information list (L) displays a plurality of entries, each including an image (an image included in the reference image of the individual data) associated with the food/beverage information, together with a food/beverage name as food/beverage information, and a caloric value per serving as nutritional value information. Further, when a user selects one of the entries, the information presentation unit 25 outputs the food/beverage information displayed in the selected entry, and the image P used as the search key, to the recording unit 26.

When the search is performed on the basis of an image portion, the information for specifying the image portion pj used for comparison is associated with food/beverage information selected by the user, and temporarily stored in the storage unit 12, with respect to the image P. When there remains an image portion pj which has not been processed (which has not associated with food/beverage information) the above processes by the information retrieval unit 24 and the information presentation unit 25 are repeated regarding the image portion pj which has not been processed. Then, the information presentation unit 25 outputs the image P, the information for specifying the image portion pj extracted from the image P, and the food/beverage information selected for each pj, to the recording unit 26.

The recording unit 26 generates record information by associating date/time information (date and time information from a calendar IC provided in an ordinary computer) with a combination of the image P used as the search key and the food/beverage information selected by the user in the process of the information presentation unit 25, and stores the record information in the storage unit 12 to be held therein. In the present aspect, the record information is used as the individual data.

According to the present aspect, an image similar to the food/beverage image captured by the user is to be retrieved not only from the previously prepared reference images but also from the images captured by the user in the past. Thereby, information regarding the food/beverage, the image of which has not been captured by the user, can be obtained, and retrieval can be performed from the images of foods/beverages which the user often eats/drinks (an image having a color and a shape which tends to match those of the captured image). In addition, the individual data reflects the user's habit in capturing images, the habit being such that whether the user captures a food/beverage image together with the plate, together with the background, or by clipping only the food/beverage, from which direction the user applies illumination to the food/beverage, and the like. Therefore, retrieval based on similarity is expected to be more accurate.

According to the present aspect, in the operations of the information presentation unit 25, as exemplified in FIG. 4(b), the images displayed in the list (L) may be divided into a list of entries including images retrieved from the individual data (foods/beverages which the user has eaten/drunk in the past; L1), and a list (L2) of entries including images retrieved from the reference data. FIG. 4(b) shows an example where a part of or all of the reference data included in the list (L2) does not include an image (reference image). Further, when the user selects one entry, the information presentation unit 25 may display a screen where the user can input the number of servings regarding the selected food/beverage (with respect to each food/beverage contained in the image P) (FIG. 5).

In FIG. 5, levels between ¼ servings (the minimum value) and 2 servings (the maximum value) are displayed, and the user can select an appropriate serving from the displayed levels. In addition, an input field to which the user can directly input the volume, an input field to which the user can directly input the caloric value for the volume or the caloric value for the food/beverage as a whole, may also be displayed. Although not shown in FIG. 5, an input field allowing the user to change the unit of the volume may also be displayed. For example, the input field may allow the user to select the unit, such as "serving", "gram", "cup", etc. When the volume is input by such a unit, the information presentation unit 25 updates the information relating to the caloric value in the food/beverage information relating to the image P (or the image portion pj extracted therefrom), in accordance with the input volume (when the unit is changeable, the information corresponding to each unit may be previously recorded, or information regarding a coefficient for converting information such as caloric values between units may be previously recorded). Further, when a caloric value is directly input, the information presentation unit 25 updates the information relating to the caloric value, in the food/beverage information relating to the image P (or the image portion pj extracted therefrom), to the input value. Accordingly, in the individual data, the user is allowed to arbitrarily input the caloric value per the volume or for the entire volume, and thus, the user can arbitrarily set a value similar to the nutritional value of the food/beverage which the user actually eats/drinks.

Further, according to the present aspect, in the operations of the information presentation unit 25, when the user selects an entry from the list (L), the character string of the name of the food/beverage included in the selected entry may be extracted, and the reference data or the individual data including the character string in the food/beverage name may be searched for. In this case, if the reference data or the individual data including the food/beverage information is retrieved through the search, the information presentation unit 25 displays the food/beverage information, and prompts the user for selection. Due to these operations, for example, when "rice" is selected, candidates such as "Chestnut rice (rice cooked with chestnuts", "cooked rice (rice seasoned and cooked with various ingredients)", etc., included in the reference data or the individual data, may be further presented to prompt the user for selection.

Further, the retrieval of the food/beverage information by the information retrieval unit 24 according to the present aspect, may be performed not only on the basis of images as mentioned above, but also on the basis of the circumstance information when the images are captured. Specifically, in this example, when the image acquisition control unit 22 receives an instruction from the user and controls the image acquisition unit 15 to capture an image, the image acquisition control unit 22 also acquires circumstance information representing the portrait/landscape orientation of the housing and the angle of the housing, and outputs the circumstance information by including the same in the image information acquired by the image acquisition unit 15.

Then, the recording unit 26 stores the image P including the circumstance information in the storage unit 12, in association with the food/beverage information selected by the user and the date/time information.

The information retrieval unit 24 refers to the circumstance information included in the image Πi (i=1, 2, . . . ) in each piece of the individual data read out by the individual data acquisition unit 23, and acquires the information regarding the portrait/landscape orientation of the housing and the information regarding the angle of the housing. When the housing is oriented with the Y-axis direction on the lower side (the gravity direction is closer to the Y-axis direction), the information retrieval unit 24 reads out the angle φ which is the angle around the X-axis, from the angle information of the housing, as the captured angle αi of the image Πi. On the other hand, the housing is oriented with the X-axis direction on the lower side (the gravity direction is closer to the X-axis direction), the information retrieval unit 24 reads out the angle ψ which is the angle around the Y-axis, from the angle information of the housing, as the captured angle αi of the image Πi.

Further, the information retrieval unit 24 acquires the information regarding the portrait/landscape orientation of the housing and the information regarding the angle of the housing, included in the image P output from the image acquisition control unit 22. When the acquired information indicates that the housing is oriented with the Y-axis direction on the lower side (the gravity direction is closer to the Y-axis direction), the information retrieval unit 24 reads out the angle φ which is the angle around the X-axis, from the angle information of the housing, as the captured angle α of the image P. On the other hand, the housing is oriented with the X-axis direction on the lower side (the gravity direction is closer to the X-axis direction), the information retrieval unit 24 reads out the angle ψ which is the angle around the Y-axis, from the angle information of the housing, as the captured angle α of the image P.

The information retrieval unit 24 extracts an image Πi in the individual data and having a captured angle αi as a retrieval candidate, the difference between the captured angle vi of the extracted image Πi and the captured angle α of the image P being within a predetermined range. Namely, a threshold value T is previously determined, αi satisfying |α−αi|<T is found, and an image Πi in the individual data and corresponding to the αi is extracted as a retrieval candidate. Here, |R| represents calculating the absolute value of R.

The information retrieval unit 24 compares the reference image and the image extracted from the individual data as a retrieval candidate, with the image P (or the image portion pj extracted from the image P) used as a search key, and acquires food/beverage information (may be more than one piece of information) associated with the reference image or the image extracted from the individual data as the retrieval candidate, similar to the image P or the image portion pj of the image P used as the search key.

In this example, the retrieval candidate can be extracted from the images included in the individual data, under a predetermined condition, i.e., the condition that, with respect to the circumstance information at the time of image capturing and the circumstance information associated with the image included in the individual data, the difference in terms of the housing angle at the time of image capturing is smaller than a predetermined threshold value.

The use of the circumstance information according to the present aspect is not limited to the above. As the circumstance information, the time slot of image capturing (for example, predetermined slots divided into a breakfast time slot, a lunch time slot, a dinner time slot, and a midnight snack time slot), the position information (acquired by GPS, etc.), and the like may be included in the images, a retrieval candidate may be extracted using such information. Thereby, for example, a croquette provided at a specific store and having a special shape, etc., can be efficiently retrieved.

In the above explanation, the image acquisition control unit 22 receives instructions from the user, and in response, controls the image acquisition unit 15 to acquire the image P used for the search. However, the present aspect is not limited thereto. Namely, the image processing apparatus 1 according to an example of the present aspect, may separately perform processes as an ordinary camera, to capture an image in accordance with the instruction from the user and to store the captured image in the storage unit 12. In this case, the image acquisition control unit 22 may not acquire the image P by capturing an image, but may read out the image P stored in the storage unit 12 and use the image as a search key.

Further, according to another example of the present aspect, in accordance with the instruction from the user, the information retrieval unit 24 uses a character string as a search key, and searches for food/beverage information contained in the reference data or the individual data. Specifically, when the instruction for the search using a character string is received from the user, the information retrieval unit 24 prompts the user to input a character string. Then, upon receiving the input of a character string from the user, the information retrieval unit 24 searches for an entry of the reference data and the individual data including the input character string in the name of a food/beverage. The information retrieval unit 24 acquires the food/beverage information (may be more than one piece of information) retrieved through the search.

The information presentation unit 25 displays a list (L) of food/beverage information retrieved by the information retrieval unit 24. The food/beverage information list (L) displays a plurality of entries each including an image (a reference image or an image included in the individual data) associated with each piece of the food/beverage information, together with the food/beverage information, i.e., the name and the caloric value per serving, of the food/beverage. When the user selects one of the entries, the information presentation unit 25 outputs the food/beverage information displayed in the selected entry, to the recording unit 26. In this case, the information presentation unit 25 may also prompt the user to input the amount or the caloric value of the food/beverage in the selected entry, and in accordance of the input from the user, the information presentation unit 25 may update the caloric value information in the food/beverage information and output the updated information to the recording unit 26.

The recording unit 26 prepares record information in which the food/beverage information presented by the information presentation unit 25 and selected by the user, is associated with the date/time information (date and time information from the calendar IC which is provided in an ordinary computer), and stores the record information in the storage unit 12 so as to be held therein. The record information is also used as the individual data. In this case, the recording unit 26 may also include the image (image included in the reference data or already recorded individual data) presented in association with the food/beverage information selected by the user, in the record information, and stores the record information in the storage unit 12 so as to be held therein.

A user of the image processing apparatus 1 according to the present aspect chooses to perform any one of the image capturing of the food/beverage to be eaten/drunk, the selection of a picture from pictures of foods/beverages eaten/drunk in the past, or the input of a character string representing the name of the food/beverage. In case that the user chooses to perform the image capturing of the food/beverage to be eaten/drunk, the image processing apparatus 1 allows the user to capture an image. Here, when the user captures an image of the food/beverage, the image processing apparatus 1 also acquires the circumstance information indicating the portrait/landscape orientation of the housing of the image processing apparatus 1 itself and the angle of the housing, and outputs the captured image by including the circumstance information in the image.

The image processing apparatus 1 searches for images similar to the captured image P, which is used as a search key, from the images included in the reference data. In addition, the image processing apparatus 1 refers to the circumstance information included in the image $\Pi i$ (i=1, 2, ...) of each piece of the individual data, and acquires the information regarding the portrait/landscape orientation of the housing and the information regarding the angle of the housing when each image Hi (i=1, 2, ... ) was captured. When the housing is oriented with the Y-axis direction on the lower side (the gravity direction is closer to the Y-axis direction), the image processing apparatus 1 reads out the angle $\varphi$ which is the angle around the X-axis, from the angle information of the housing, as the captured angle $\alpha i$ of the image $\Pi i$. On the other hand, when the housing is oriented with the X-axis direction on the lower side (the gravity direction is closer to the X-axis direction), the image processing apparatus 1 reads out the angle $\psi$ which is the angle around the Y-axis, from the angle information of the housing, as the captured angle $\alpha i$ of the image $\Pi i$. Then, the image processing apparatus 1 extracts images $\Pi i$ in the individual data, as retrieval candidates, each of the extracted images having a captured angle $\alpha i$ which satisfies the condition that the difference between the captured angle $\alpha i$ and the captured angle $\alpha$ of the image P is lower than a predetermined threshold value T. The image processing apparatus 1 searches for images similar to the image P, used as the search key, from the images extracted as retrieval candidates.

Accordingly, the image processing apparatus 1 searches for images similar to the image p, used as a search key, in both the reference data and the individual data. With respect to the individual data, the data having similar circumstance information at the time of image capturing, and having a similar image, is to be retrieved. As exemplified in FIG. 4(a), the image processing apparatus 1 displays the image P used as the search key, and a list (L) of food/beverage information associated with the images retrieved through the search. The food/beverage information list (L) includes a plurality of entries each including an image (reference image or an image included in the individual data) associated with the food/beverage information, as well as the food/beverage information including the name and the caloric value per serving of the food/beverage. Further, when the user selects one of the entries, the information presentation unit 25 prepares record information in which the food/beverage information displayed in the selected entry, the image P used for the search, and the date/time information are associated to each other, and stores the record information in the storage unit 12 so as to be held therein.

Upon receiving an instruction, from the user, to display the record information held in the storage unit 12, the image processing apparatus 1 preforms a process to display the same. Specifically, the image processing apparatus 1 uses the date/time information included in the record information, generates a list of record information for each month, each list including the record information having the date/time information indicating the relevant month, and displays the generated list (FIG. 6). In the list, the pieces of the record information are arranged in the order of the date/time information. Specifically, according to an example of the present aspect, when a list is displayed, instead of a list of the entire record information, a list of images included in the record information (when no image is included, an image previously determined as a default image may be used) may be displayed. When the user selects one image from the list, the image processing apparatus 1 displays the entirety of the record information including the selected image (FIG. 7).

When the selected image is associated with the information which specifies image portions extracted from the image, and the information regarding the food/beverage captured in each of the specified image portions, the image processing apparatus 1 displays the relevant image and also displays a list of food/beverage information regarding the foods/beverages captured in the image portions.

Further, according to an example of the present aspect, the image processing apparatus 1 may be realized by a device usually referred to as a smartphone (a mobile phone in which an application provided by a software provider can be installed and executed). In this case, depending on the situation such that the smartphone is changed to a new model, and the performance of the camera, i.e., the image capturing device, becomes different from that of the camera used for obtaining the individual data accumulated before the change, the individual data accumulated before the change may be treated as reference data.

According to the present aspect, the reference data is stored in the image processing apparatus 1, however, the present disclosure is not limited thereto. The reference data may be stored in the database of a server apparatus which can be accessed through the network, etc. In this case, the image processing apparatus 1 transmits an image to be used as a key, to the server apparatus, the image being a captured image (an image selected by the user from the images captured in the past) or a food/beverage part from the image. The server apparatus extracts entries of the reference data so that each of the extracted entry includes an image similar to the image P used as the key. The image processing apparatus 1 receives the entries from the server apparatus and acquires the food/beverage information relating to the image similar to the captured image P.

Even in the case that the reference data is stored in the server apparatus, the individual data is stored in the storage unit 12. Thereby, rapid response to the user's operation is possible, even when connection to the server apparatus is not available, or the communication to the server apparatus requires a long time.

EXPLANATION ON NUMERALS

1 image processing apparatus, 11 control unit, 12 storage unit, 13 operation unit, 14 display unit, 15 image acquisition unit, 16 communication unit, 17 sensor unit, 21 reference data acquisition unit, 22 image acquisition control unit, 23 individual data acquisition unit, 24 information retrieval unit, 25 information presentation unit, 26 recording unit

The invention claimed is:

1. An image processing apparatus connected to a database which holds a plurality of pieces of reference data including previously prepared food/beverage information together with reference images so as to be able to access the same, the image processing apparatus comprising:
   a holding device which holds, as a piece of individual data, at least one image of foods/beverages which are eaten/drunk by a user in the past, associated with information regarding the foods/beverages, the at least one image being captured in the past by the user,
   an image capturing device which captures an image of food/beverage,
   an acquisition device which compares the captured image of food/beverage, with both the at least one image of foods/beverages captured in the past by the user and the reference images included in the previously prepared reference data, and acquires food/beverage information associated with the at least one image captured in the past by the user or included in the reference data together with at least one of the reference images, which is similar to the captured image,
   a holding control device which controls the holding device to hold the acquired food/beverage information in association with the captured image of food/beverage, and
   a displaying control device which displays, upon receiving an instruction from the user, a list of the food/beverage information and associated images of foods/beverages eaten/drunk in the past held in the holding device.

2. An image processing apparatus according to claim 1, wherein
   the image capturing device acquires and outputs circumstance information at time of image capturing,
   the holding control device controls the holding device to hold the individual data in which the acquired food/beverage information, the captured image, and the acquired circumstance information are associated with each other,
   the acquisition device, in which when the circumstance information at the time of image capturing and the circumstance information associated with the image included in the individual data satisfy a predetermined condition, the image associated with the circumstance information is compared with the captured image, and
   the circumstance information includes at least one selected from information regarding a time slot at the time of image capturing, position information, housing angle information at the time of image capturing, and information relating to illumination.

3. The image processing apparatus according to claim 1, wherein the image processing apparatus is a smartphone, and where the smartphone is changed to a new model, the individual data accumulated before the change is treated as the reference data.

* * * * *